US007311506B2

(12) United States Patent
Border et al.

(10) Patent No.: US 7,311,506 B2
(45) Date of Patent: Dec. 25, 2007

(54) ACTUATOR BASE NUBBIN ALIGNMENT

(75) Inventors: John N. Border, Walworth, NY (US); Joseph M. Recco, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 308 days.

(21) Appl. No.: 10/960,189

(22) Filed: Oct. 7, 2004

(65) Prior Publication Data
US 2006/0078639 A1  Apr. 13, 2006

(51) Int. Cl.
B29C 43/51 (2006.01)
B29C 43/58 (2006.01)

(52) U.S. Cl. .................. 425/135; 425/355; 425/408; 425/411; 425/468

(58) Field of Classification Search ............ 425/150, 425/135, 352–355, 408, 411, 441, 467–468, 425/116, 190, 405.1, 138, 139, 577; 264/40.5, 264/328.7
See application file for complete search history.

(56) References Cited

U.S. PATENT DOCUMENTS

| 5,587,184 A | * | 12/1996 | Leonard et al. ............. 425/466 |
| 6,875,384 B1 | * | 4/2005 | Whitney ..................... 425/150 |
| 2001/0053395 A1 | | 12/2001 | Hosoe |

* cited by examiner

Primary Examiner—Yogendra N. Gupta
Assistant Examiner—Thu Khanh T. Nguyen
(74) Attorney, Agent, or Firm—Andrew J. Anderson

(57) ABSTRACT

In accordance with the teachings of the present invention, a mold comprises a nubbin positioned within the mold, and an actuator positioned within the mold to align the nubbin. The actuator may be implemented with a piezoelectric material, a magnetorestrictive material, an electrorestrictive material, etc. In one embodiment, the actuator is formed into a cylinder and placed around a nubbin in a mold. When the actuator receives a stimulus, the actuator constricts decreasing the size of the inner diameter. Decreasing the size of the inner diameter causes the actuator to constrict and align the nubbin along a centerline.

23 Claims, 6 Drawing Sheets

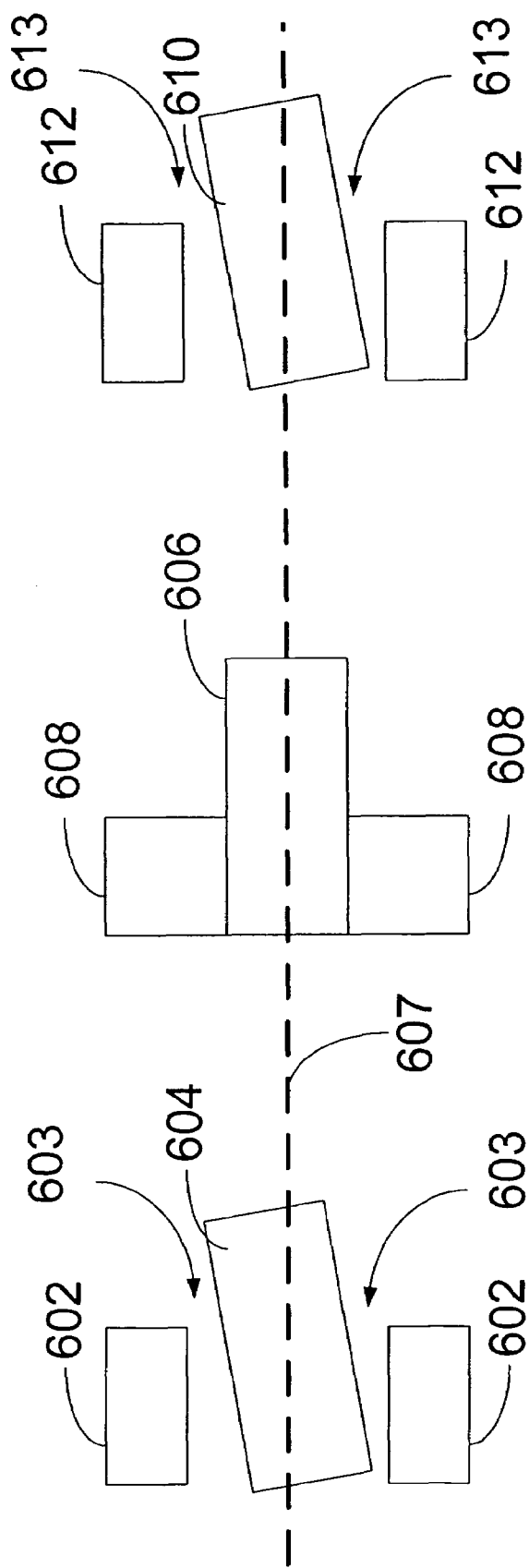

ACTUATOR BASE NUBBIN ALIGNMENT

FIELD OF THE INVENTION

The invention relates to the production of precision molded parts. Specifically, the invention relates to a method for improving the alignment of sections of a mold.

BACKGROUND OF THE INVENTION

Precise alignment of adjacent sections of a mold is critical to the production of a precision-molded part such as a lens. The alignment of adjacent sections of a mold is most challenging when the adjacent sections are positioned across the parting line of the mold. Once the mold is aligned a molded part may be produced with the accuracy and tolerances required by the designer. For example, it is envisioned that some applications will require an alignment precision of less than ½ a micron.

During the molding operation, the accuracy of the alignment between adjacent sections of the mold determines the accuracy of the optical surfaces of the molded lens. The performance of the molded lens is often limited by the accuracy of the alignment of the optical surfaces of the lens relative to each other. Misalignment of the axis of one surface of a lens relative to the axis of the other surface of the lens is the major contributor to lens irregularity problems such as coma and RMS. Ultimately, the lens problems impact the imaging quality of the lens. In many applications the axis of each surface of the lens cannot be misaligned by more than 10 microns. In some cases the misalignment cannot exceed 3 microns.

Misalignment of the optical surfaces in the mold cavity results in the misalignment of the axes of the surfaces of the molded lens. Specifically, metal inserts in the mold that include the optical surfaces are rod-like structures known as nubbins. When the mold halves are brought together, the nubbins form a cavity with optical surfaces inside the mold. Molten plastic is then introduced in the mold cavity under pressure such that it conforms to the shape of the cavity and replicates the optical surfaces of the mold to form a lens. The plastic is then cooled sufficiently to enable the molded lens to be removed or ejected from the mold cavity. As a result, when the nubbins are not properly aligned, the axis of each side of the lens is misaligned.

Conventional methods for aligning the surfaces of a lens in a mold include using guide pins and/or taper locks positioned within a mold. The guide pins and/or taper locks are used to enable one half of the mold to accurately engage a second half of the mold.

Since the guide pins must slide together when the mold halves are brought together, they must have sliding clearance. The clearance requirement for the guide pins is about 5 microns for each sliding clearance. Multiplying this by the number of guide pins and combining this for both mold halves, results in a 10 to 20 micron misalignment problem resulting from the guide pins.

A number of studies have shown that the nubbin clearance is a major contributor to misalignment in a molded plastic lens. Nubbin alignment in plastic lens molding is difficult to control due to the need for clearance around a first nubbin (i.e., found in the first half of the mold) that enables the first nubbin to move during ejection of the molded lens after molding. Typically, the clearance required of the first nubbin is on the order of 3 to 5 microns and a similar clearance is required of the oppositely disposed nubbin (i.e., on the opposite side of the mold). The total typical misalignment for a molded plastic lens is then 16 to 30 microns based on the guide pins and the nubbins.

In US 2001/0053395 Hosoe describes a method for aligning molding die members wherein a flowing gas or liquid is supplied to the clearance around a nubbin inside a bore in a mold. As a result, the nubbin is forced into the center of the bore.

However, the design in Hosoe is complex. The design requires a uniform flow of gas on both sides of the nubbin or the nubbin will be preferentially pushed to one side or the other. In addition, since the control of the flowing gas is complex, the piping disclosed in Hosoe is elaborate and difficult to include in a mold.

Thus, there is a need for a method and apparatus for aligning a nubbin. There is a need for a method and apparatus for aligning each section of a mold relative to the other.

SUMMARY OF THE INVENTION

The present invention is directed to overcoming one or more of the problems set forth above. Briefly summarized, according to one aspect of the present invention, a mold comprises a first section and a second section oppositely disposed from the first section; and an actuator positioned within the mold to align the first section relative to the second section. A molding apparatus comprises a mold, a nubbin positioned within the mold; and an actuator capable of changing dimensions positioned around the nubbin to align the nubbin when the actuator changes dimensions.

A molding apparatus comprises a mold; a nubbin positioned within the mold; and a plurality of actuators positioned within the mold, the plurality of actuators each capable of changing dimensions in response to an input, the nubbin aligning in response to at least one of the plurality of actuators changing dimensions.

A mold comprises a first section comprising, a first nubbin, the first nubbin including an upper region and a lower region, a first actuator positioned to align the upper region of the first nubbin, a second actuator positioned to align the lower region of the first nubbin and a receptacle capable of receiving a guide pin with a third actuator to align the guide pin; and a second section capable of coupling with the first section, the second section comprising, a second nubbin, the second nubbin including an upper region and a lower region, a fourth actuator positioned to align the upper region of the second nubbin, a fifth actuator positioned to align the lower region of the second nubbin, a guide pin capable of insertion into the receptacle.

A mold comprises a first section with at least one nubbin and a second section with nubbins that match said at least one nubbin in the first section and guide pins between the two sections: wherein said at least one nubbin in the first section further comprises a first region and a second region, first actuators are positioned on the first region of the at least one nubbin to align the first region of the at least one nubbin, and second actuators are positioned on the second region of the at least one nubbin to align the second region of the at least one nubbin.

A mold comprises adjacent sections located on either side of a parting line; and an actuator positioned within the mold to align the adjacent sections relative to each other.

In one embodiment, an actuator is positioned around (i.e., fully or partially encircles) a nubbin in a mold. The actuator has the ability to change dimension in response to a stimulus or input. When the actuator changes dimension, the actuator constricts the shaft of the nubbin and the nubbin is centered in a bore.

In accordance with the teachings of the present invention, a variety of actuators may be implemented, such as piezoelectric actuators, electrostrictive actuators, magnetostrictive actuators, hydraulic actuators, etc. Each actuator may be constructed in a cylindrical geometry with an action that operates in a radial direction thereby reducing the center diameter. Reducing the center diameter of the actuator enables the actuator to constrict the nubbin and center the nubbin in the bore.

The actuator is used to grip the nubbin shaft prior to molding to precisely locate the nubbin in the center of a bore. Following molding the actuator releases the nubbin to produce enough clearance for the nubbin to move during ejection. As a result, the nubbin is tightly held during molding to promote precise alignment and nubbin clearance is provided during ejection to prevent binding.

Actuators of the type mentioned above typically have a useful life of as high as billions of cycles. In one embodiment, the movement of the actuator is on the order of microns. The actuator operates after receiving input from a stimulus. In one embodiment, the stimulus is an electric signal.

The above and other objects of the present invention will become more apparent when taken in conjunction with the following description and drawings wherein identical reference numerals have been used, where possible, to designate identical elements that are common to the figures.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention precisely aligns two sections of a mold and precisely centers a nubbin within a mold with minimal complexity.

BRIEF DESCRIPTION OF THE DRAWINGS

FIGS. 6A, 6B, 6C display an enlarged view of a nubbin encircled by an actuator.

DETAILED DESCRIPTION OF THE INVENTION

Figure 1:
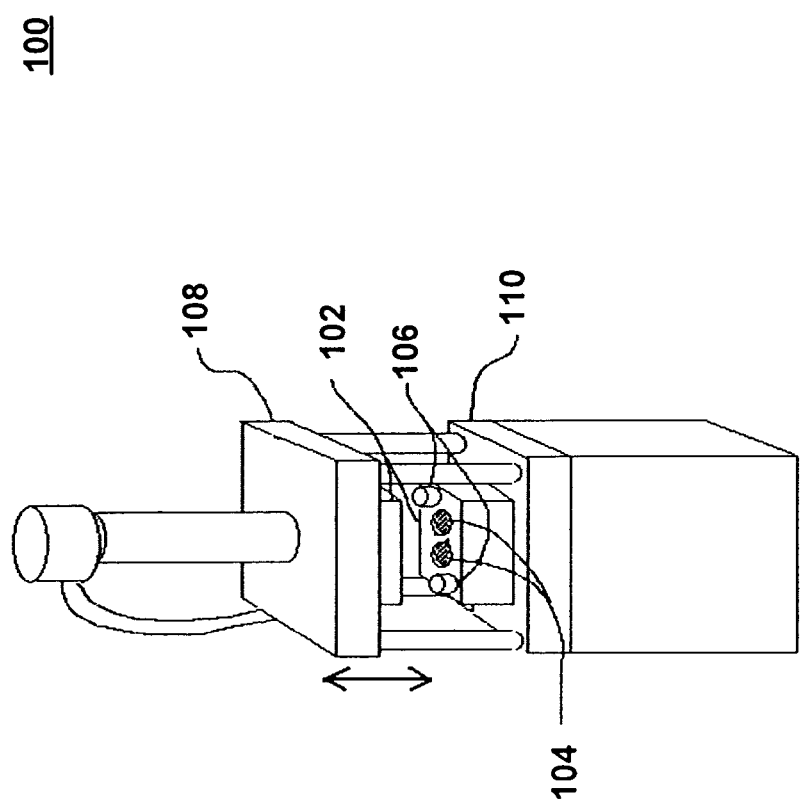
FIG. 1 is a molding machine.

Referring to FIG. 1, a molding machine 100 is shown. The molding machine 100 includes mold halves 102. The mold halves 102 are the two opposite sides of the mold that engage each other to produce a molded part. Optical surfaces of nubbins 104 are shown positioned in the mold halves 102. The optical surfaces of the nubbins 104 engage each other and form a cavity used to produce the molded part. The mold halves 102 are aligned using guide pins 106, which engage matching bores in the other half of the mold when the mold is closed. An upper platen 108 of the injection-molding machine 100 and a lower platen 110 of the injection-molding machine 100 are shown. The upper platen 108 is an upper plate that moves downward to bring the two mold halves 102 together. The upper platen 108 then exerts downward pressure and the lower platen 110 is a lower plate that exerts upward pressure to hold the mold halves 102 tightly together during the molding process.

Figure 2:
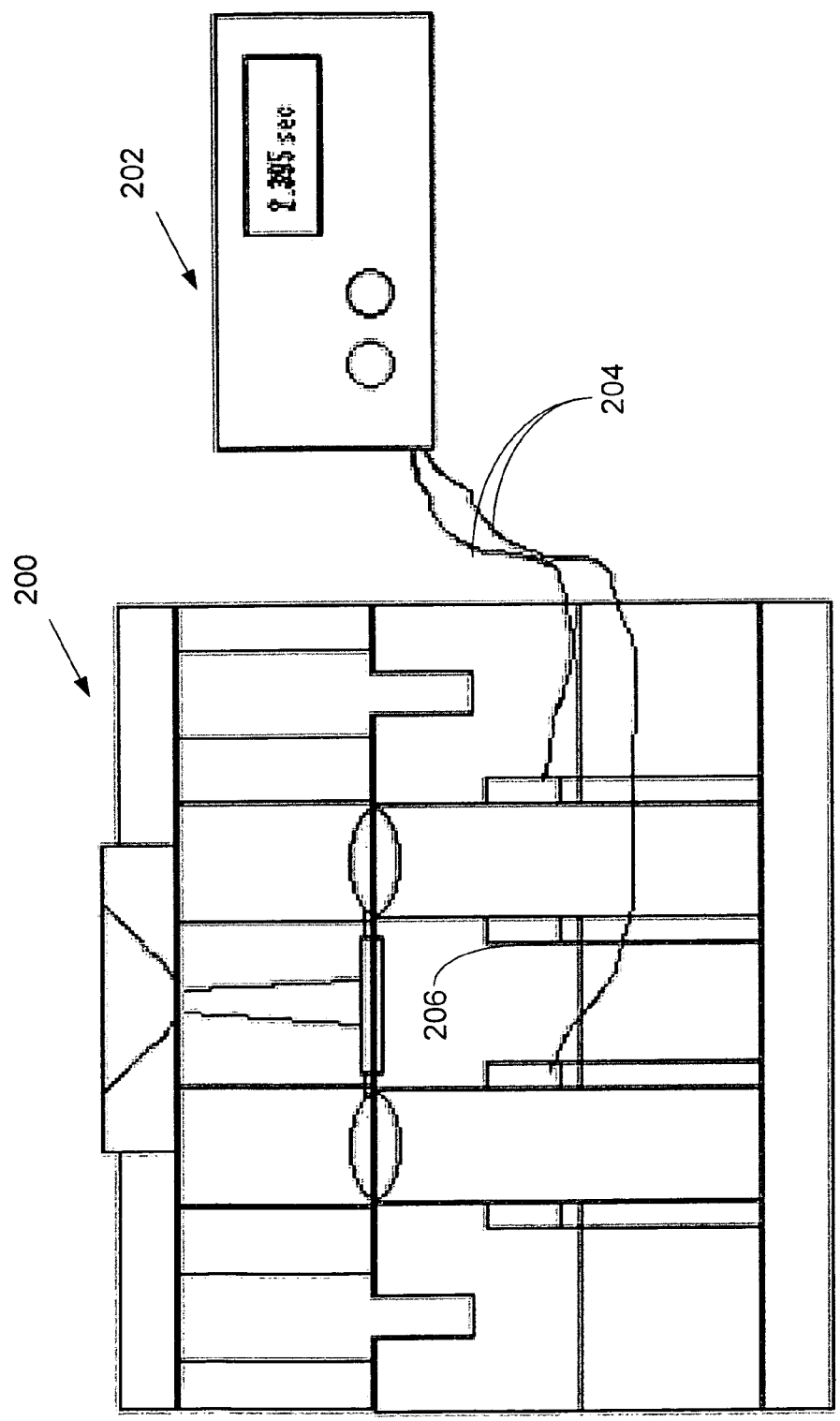
FIG. 2 is a mold section with actuators, wires, and controller.

Referring to FIG. 2, a mold section with actuators, wires, and controller is shown. The mold 200 is connected to a controller 202. The controller 202 is connected through connection wires 204 to actuators 206. In one embodiment, the controller 202 may be implemented with a computer and/or electronic device connected to the molding machine 100 of FIG. 1 and capable of controlling and operating actuator 206. In addition, the connection wires 204 may be implemented or the communication between the controller 202 and the actuator 206 may be wireless.

Figure 3:
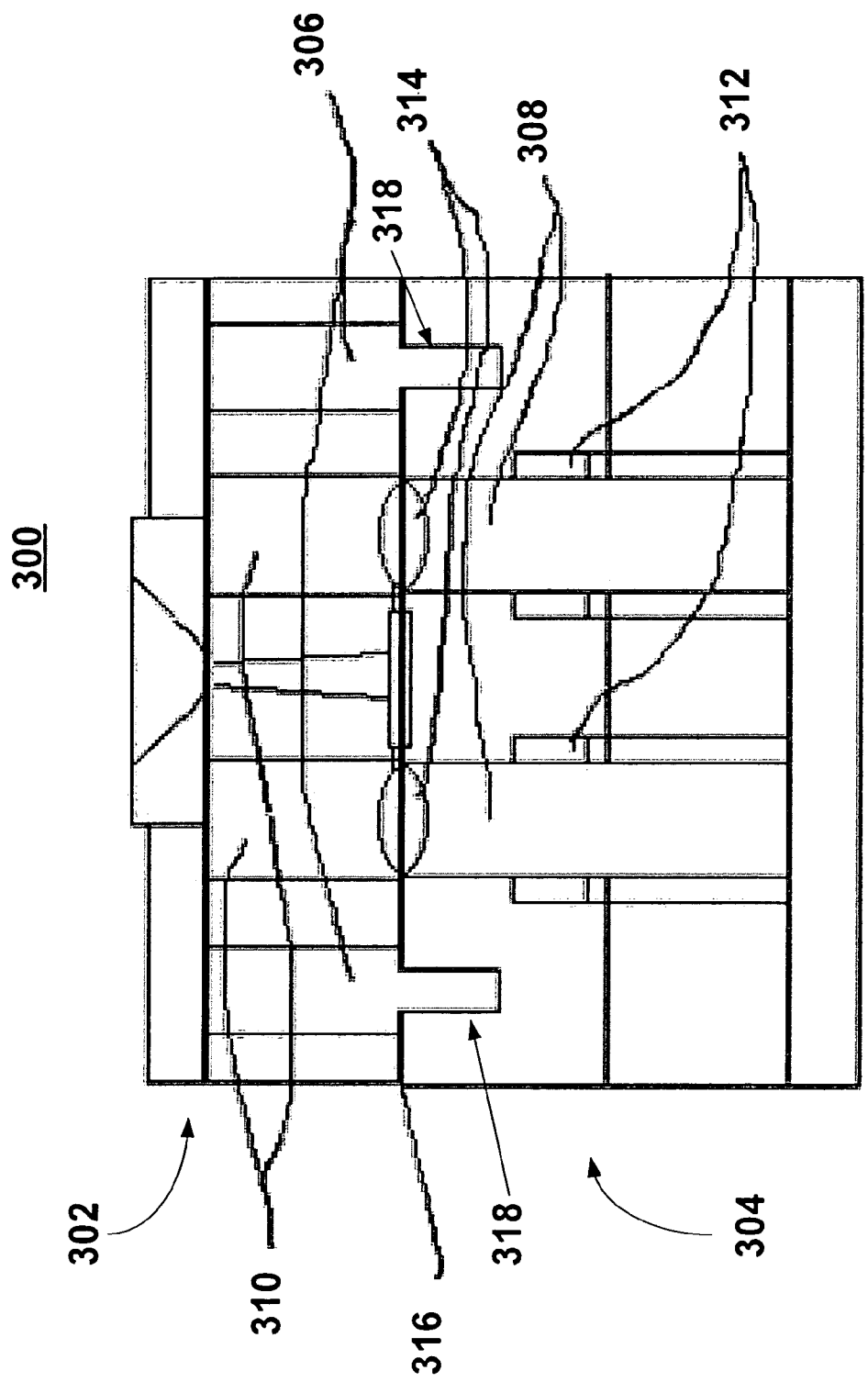
FIG. 3 is a mold section with actuators.

Referring to FIG. 3, a mold section with actuators is shown. The mold section 300 includes an upper section of the mold 302 and a lower section of the mold 304. Guide pins 306 in the upper section of the mold 302 engage matching bores 318 in the lower section of the mold 304 to guide the upper section of the mold 302 into the lower section of the mold 304. The upper section of the mold 302 and the lower section of the mold 304 also include upper nubbins 310 and lower nubbins 308, respectively. The upper nubbins 310 and the lower nubbins 308 combine to form a mold cavity 314 separated along parting line 316. Actuators 312 are also shown.

Figure 4:
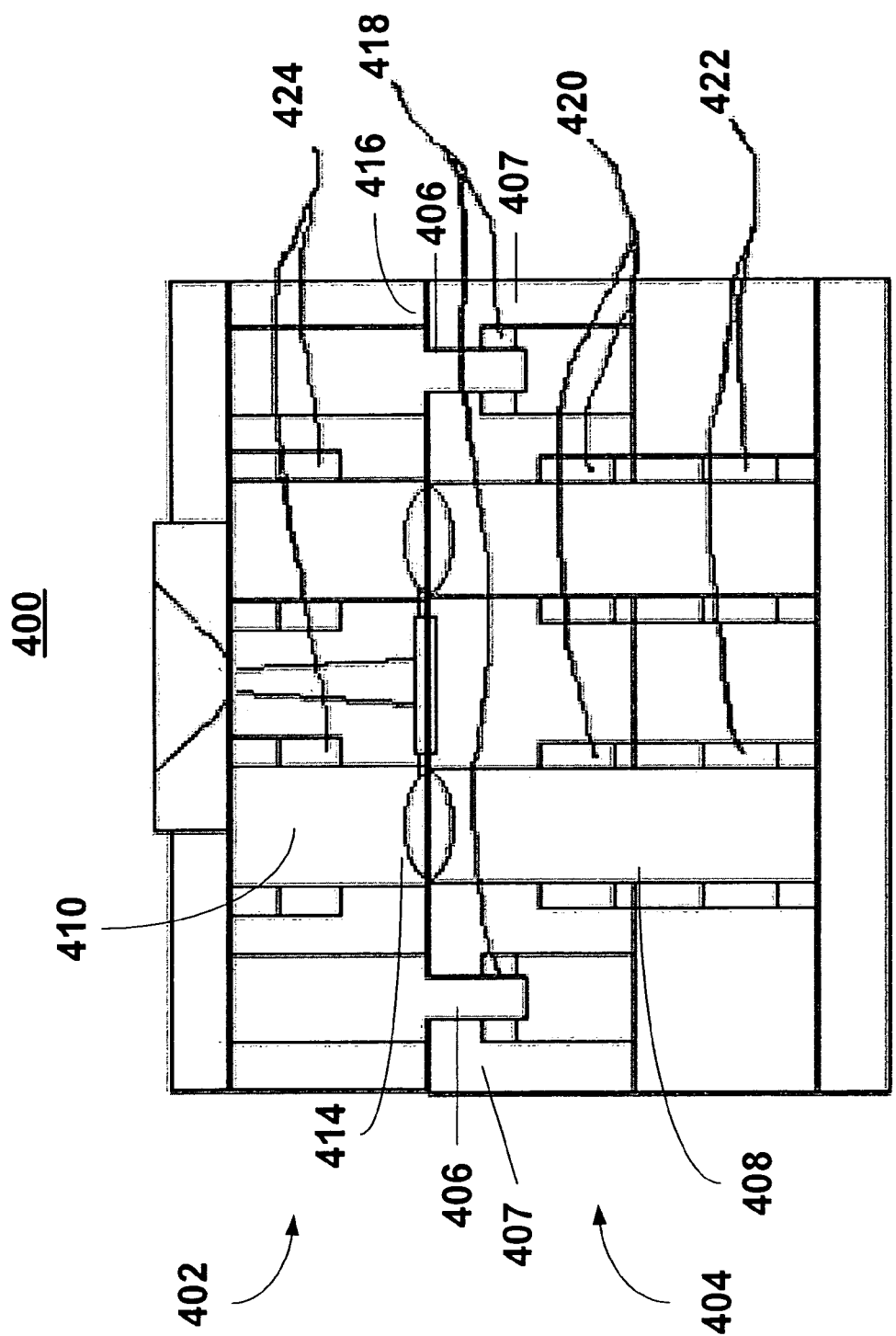
FIG. 4 is a mold section with actuators positioned in various locations.

Referring to FIG. 4, a mold section with actuators positioned in various locations is shown. A mold section is shown as 400. The mold section 400 includes an upper section of the mold 402 and a lower section of the mold 404. Guide pins 406 and matching bores 407 are used to guide the upper section of the mold 402 into the lower section of the mold 404. The upper section of the mold 402 and the lower section of the mold 404 also include upper nubbins 410 and lower nubbins 408, respectively. The upper nubbins 410 and the lower nubbins 408 combine to form lens cavities 414 separated along parting line 416.

Guide pin actuators 418 are shown positioned around guide pins 406. A lower nubbin alignment actuator sleeve 420 is shown positioned around lower nubbins 408. A lower nubbin tilt actuator sleeve 422 is also shown positioned around lower nubbins 408. An upper nubbin alignment actuator sleeve 424 is shown positioned around upper nubbins 410.

It should be appreciated that although the actuators (420, 422, 424) have been described as positioned around (i.e., encircling) the nubbins (408, 410) and/or the guide pins 406, other configurations are within the scope of the present invention. For example, the actuators (420, 422, 424) may be positioned relative to the nubbins (408, 410) and/or guide pins 406 such that when the actuators (420, 422, 424) respond to a stimulus, the actuators (420, 422, 424) engage the nubbins (408, 410) and/or guide pins 406 to align the nubbins (408, 410) and/or guide pins 406. In one embodiment, an actuator (420, 422, 424) and/or guide pin (406) may be positioned next to the nubbin (408, 410) and/or guide pin (406) such that when the actuator (420, 422, 424) receives a stimulus, the actuator (420, 422, 424) moves laterally to engage the nubbin (408, 410) and/or guide pin (406) moving the nubbin (408, 410) and/or guide pin (406) and the connected mold half into alignment.

Figure 5:
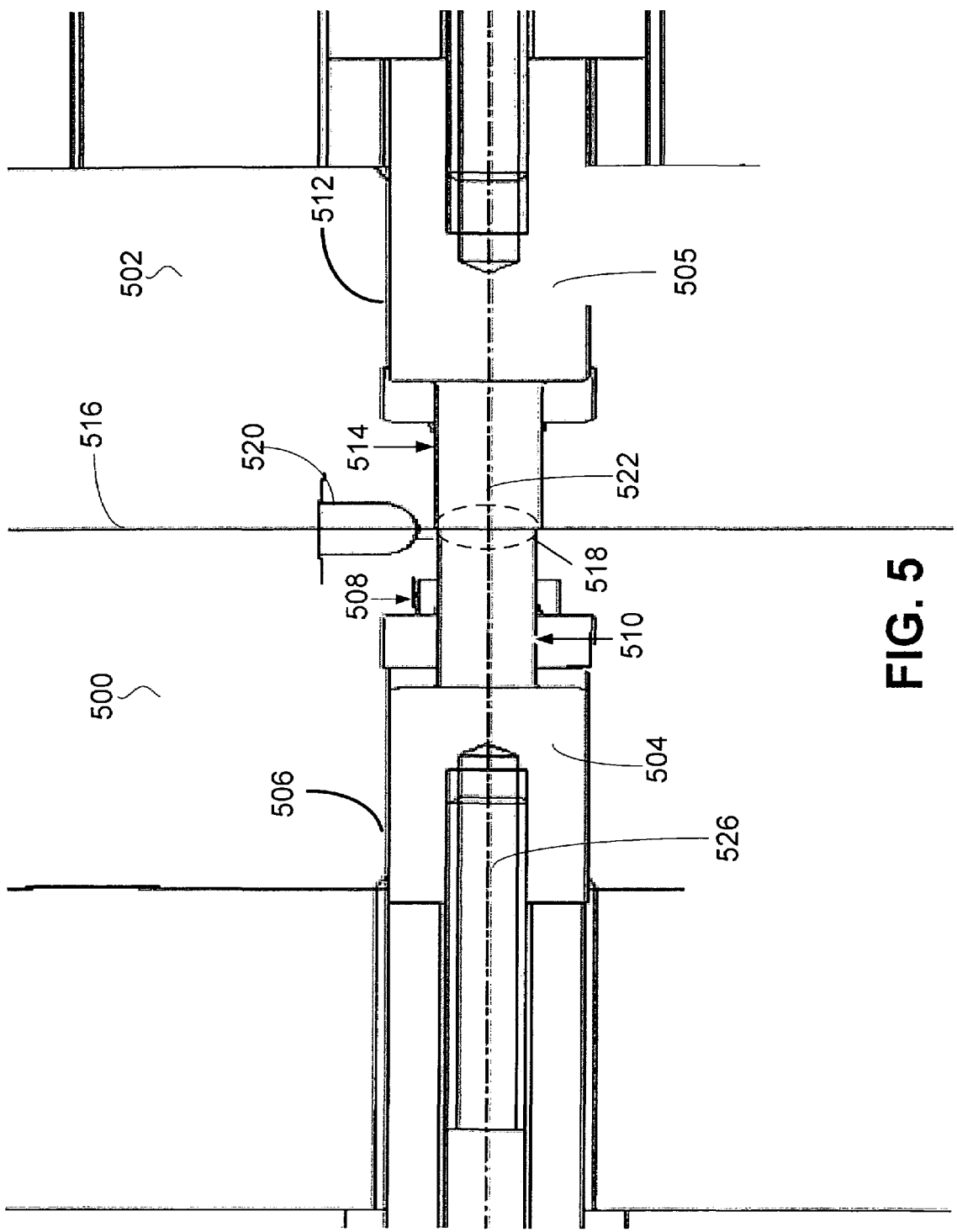
FIG. 5 is a mold section with actuators similar to those shown in FIG. 3, but highlighting the nubbins.

Referring to FIG. 5, a mold section highlighting the nubbins is shown. A first mold section (i.e., half) is shown as 500 and a second mold section (i.e., half) is shown as 502. A first nubbin is shown as 504. The first nubbin 504 includes an inner nubbin shaft 510 and an outer nubbin shaft 506. A second nubbin is shown as 505. The second nubbin 505 includes an inner nubbin shaft 514 and an outer nubbin shaft 512. The inner nubbin shaft 510 and the inner nubbin shaft 514 interface at the parting line 516 to form an optical surface (i.e., cavity) 518. An actuator 508, such as a piezoelectric band, is shown positioned around inner nubbin shaft 510. In one embodiment, the inner nubbin shaft 514 has a fit clearance since it is stationary and does not have to move. The inner nubbin shaft 510 has a sliding clearance since it has to move to eject the part from the mold each time a part is manufactured.

In one embodiment, the inner nubbin shafts 510 and 514 are positioned along a horizontal axis 522. A mold cavity is formed by the optical surface 518 about the parting line 516 when the mold halves (500, 502) are forced together by platens. Molten plastic is forced into the mold cavity under pressure through the runner 520. A part (i.e., lens) then cools and the plastic solidifies, the mold halves (500, 502) move apart, and the first nubbin 504 is then moved to push the part out of the mold.

An aspect of the invention is that prior to the molten plastic being forced into the mold cavity, a stimulus, such as an electric voltage, electric current, or hydraulic pressure, is applied to an actuator 508 to precisely locate the first nubbin 510. When the stimulus is applied to the actuator 508, the actuator 508 changes dimensions and forcibly locates the inner nubbin shaft 510 within the bore in the mold. The inner nubbin shaft 510 is forcibly placed along the centerline 526 by the actuator 508.

In one embodiment, the actuator 508 is implemented with a piezoelectric band made of ceramic materials. When a voltage is applied to the actuator 508, the actuator 508 changes dimension. For example, in one embodiment, the actuator 508 is designed as a cylinder and is positioned around the inner nubbin shaft 510. When voltage is applied to the actuator 508, the inner diameter of the actuator 508 gets smaller.

When the inner diameter becomes smaller, the actuator 508 encloses (i.e., grabs, constricts) the inner nubbin shaft 510 and forcibly locates (i.e., moves) the inner nubbin shaft 510 along the centerline 526. When the voltage is removed, the actuator 508 returns back to its previous dimension, providing clearance so that the inner nubbin shaft 510 may be moved. In one embodiment, the application of the actuator 508 to the inner nubbin shaft 510 moves the inner nubbin shaft 510 in increments of microns or less.

Once the inner nubbin shaft 510 and the inner nubbin shaft 514 are properly positioned relative to each other (i.e., aligned) and the optical surface 518 combine to form a cavity, molten plastic is forced under pressure through the runner 520 into the optical surface (i.e., cavity) 518. Once the plastic is in the optical surface (i.e., cavity 518), a lens or other part is formed. The plastic lens then goes through a cooling phase. The plastic is cooled to a solid and the mold halves (500, 502) are separated. The first nubbin 504 then moves forward to dislodge the lens from the mold.

In accordance with the teachings of the present invention, the actuator 508 may be implemented with a variety of technologies. For example, electrostrictive or magnetostrictive actuators may be implemented. In another embodiment, a hydraulic actuator may be implemented. The hydraulic actuator may be implemented with a thin sleeve actuator. A cavity is deployed behind the sleeve actuator. The cavity is used to apply hydraulic pressure. The sleeve actuator deflects and grabs the nubbin shaft when the hydraulic pressure is applied.

It should be appreciated that in accordance with the teachings of the present invention, in addition to using different types of actuators, the actuators may be placed in a variety of locations within the mold as discussed with reference to FIG. 4.

In accordance with another embodiment of the present invention, a plurality of actuators are placed within a mold in positions that would align the nubbin when the actuators are operational. For example, placing an actuator on a guide pin will adjust the entire mold and consequently adjust the alignment of the nubbins. It should be appreciated that positioning the actuator at any location within the mold that would assist in aligning the nubbin is within the scope of the present invention. In addition, several actuators may be positioned within the mold and coordinated simultaneously to provide more precision when aligning the nubbin. For example, actuators placed along the inner and outer shafts of the nubbin, actuators placed on the guide pins, etc. may be combined to provide incremental levels of precision.

Referring to FIGS. 6A, 6B, and 6C, an enlarged view of a nubbin encircled by an actuator is shown. In one embodiment, an actuating device includes any device that would change dimension as a result of an input or a stimulus, where the input or stimulus may be a voltage, electrical current, magnetic field, hydraulic input, etc. The input or stimulus is synchronized with the operation of the mold to constrict the nubbin and release the nubbin at the appropriate time in the molding process.

FIG. 6A displays an actuator prior to receiving an input or stimulus that causes the actuator 602 to constrict around the nubbin 604. As shown in FIG. 6A, there is sufficient clearance for the nubbin 604 to move back and forth as shown by the clearance region 603. It should also be noted that the nubbin 604 is misaligned relative to the centerline shown as 607.

Referring to FIG. 6B, an enlarged view of a nubbin encircled by an actuator is shown. FIG. 6B displays the actuator after receiving an input or stimulus that causes the actuator 608 to constrict around the nubbin 606. As shown in FIG. 6B, there is no clearance between the actuator 608 and the nubbin 606. The actuator 608 receives the stimulus or input and changes dimensions. The change in dimensions causes the actuator 608 to constrict the nubbin 606. Since the actuator 608 maintains the same volume, the length of the actuator decreases and the inner diameter of the actuator 608 decreases to constrict the nubbin 606. As the actuator 608 constricts the nubbin 606, the actuator 608 also aligns the nubbin 606 relative to the centerline shown as 607.

Referring to FIG. 6C, an enlarged view of a nubbin 610 encircled by an actuator 612 is shown after the stimulus has been removed from the actuator 612. In FIG. 6C, after the stimulus has been removed, there is once again room for the nubbin 610 to move back and forth as shown by the clearance region 613. It should also be noted that the nubbin 610 is once again misaligned relative to the centerline shown as 607.

The invention has been described with reference to a preferred embodiment. However, it will be appreciated that variations and modifications can be affected by a person of ordinary skill in the art without departing from the scope of the invention.

PARTS LIST 100 molding machine
102 mold halves
103 nubbins
106 guide pins
108 upper platen
110 lower platen
200 mold
202 controller
204 connection wire
206 actuators
300 mold section
302 upper section of mold
304 lower section of mold
306 guide pins
308 lower nubbins
310 upper nubbins
312 actuators
314 mod cavity
316 parting line
318 matching bores
400 mold section
402 upper section of the mold
404 lower section of the mold
406 guide pins
407 matching bores
408 lower nubbins
410 upper nubbins
414 lens cavities
416 parting line
418 guide pin actuators
420 lower nubbins actuator sleeves Part list cont.
422 lower nubbins tilt actuator sleeve
424 upper nubbin alignment actuator sleeve
500 first mold section
502 second mold section
504 first nubbin
506 outer nubbin shaft
508 actuator
510 inner nubbin shaft
512 outer nubbin shaft
514 inner nubbin shaft
516 parting line
518 optical surface
520 runner
522 horizontal axis
526 centerline
602 actuator
603 clearance region
606 nubbin
607 centerline
608 actuator
610 nubbin
612 actuator
613 clearance region

What is claimed is:

1. A molding apparatus comprising:
a mold;
a nubbin positioned within the mold; and
an actuator capable of changing dimensions positioned around the nubbin to align the nubbin when the actuator changes dimensions;
wherein the actuator operates after receiving input from a stimulus to tightly hold the nubbin during molding of a molded part to promote precise alignment and to release the nubbin following molding to produce clearance for the nubbin to move during ejection of the molded part to prevent binding.

2. A molding apparatus as set forth in claim 1, wherein the actuator comprises a piezoelectric material.

3. A molding apparatus as set forth in claim 1, wherein the actuator is a magnetostrictive actuator.

4. A molding apparatus as set forth in claim 1, wherein the actuator is an electrostrictive actuator.

5. A molding apparatus as set forth in claim 1, wherein the actuator is a hydraulic actuator.

6. A molding apparatus comprising:
a mold;
a nubbin positioned within the mold; and
a plurality of actuators positioned within the mold, the plurality of actuators each capable of changing dimensions in response to an input, the nubbin aligning in response to at least one of the plurality of actuators changing dimensions;
wherein at least one of the actuators operates after receiving input from a stimulus to tightly hold the nubbin during molding of a molded part to promote precise alignment and to release the nubbin following molding to produce clearance for the nubbin to move during ejection of the molded part to prevent binding.

7. A molding apparatus as set forth in claim 6, wherein at least one of the plurality of actuators comprises a piezoelectric material.

8. A molding apparatus as set forth in claim 6, wherein at least one of the plurality of actuators is a magnetostrictive actuator.

9. A molding apparatus as set forth in claim 6, wherein at least one of the plurality of actuators is a electrostrictive actuator.

10. A molding apparatus as set forth in claim 6, wherein at least two of the actuators change dimensions.

11. A mold comprising:
a first section comprising a first nubbin, the first nubbin including an upper region and a lower region, a first actuator positioned to align the upper region of the first nubbin, a second actuator positioned to align the lower region of the first nubbin and a receptacle capable of receiving a guide pin with a third actuator positioned to align the guide pin; and
a second section capable of coupling with the first section, the second section comprising a second nubbin, the second nubbin including an upper region and a lower region, a fourth actuator positioned to align the upper region of the second nubbin, a fifth actuator positioned to align the lower region of the second nubbin, a guide pin capable of insertion into the receptacle;
wherein at least one actuator operates after receiving input from a stimulus to tightly hold a nubbin during molding of a molded part to promote precise alignment and to release the nubbin following molding to produce clearance for the nubbin to move during ejection of the molded part to prevent binding.

12. A mold as set forth in claim 11, wherein the first actuator is an alignment actuator.

13. A mold as set forth in claim 11, wherein the third actuator is an alignment actuator.

14. A mold as set forth in claim 11, wherein the fourth actuator is an alignment actuator.

15. A mold as set forth in claim 11, wherein the second actuator is a tilt actuator.

16. A mold as set forth in claim 11, wherein the fifth actuator is a tilt actuator.

17. A mold comprising:
a first section with at least one nubbin and a second section including nubbins that match said at least one nubbin in the first section and guide pins positioned between the first and second section;
wherein said at least one nubbin in the first section further comprises a first region and a second region, first actuators are positioned on the first region of the at least one nubbin to align the first region of the at least one nubbin, and second actuators are positioned on the second region of the at least one nubbin to align the second region of the at least one nubbin;
wherein at least one actuator operates after receiving input from a stimulus to tightly hold a nubbin during molding of a molded part to promote precise alignment and to release the nubbin following molding to produce clearance for the nubbin to move during ejection of the molded part to prevent binding.

18. A mold as set forth in claim 17, in which the nubbins in the second section of the mold have at least one actuator associated with the nubbins to align the nubbins.

19. A mold as set forth in claim 17, in which the guide pins have actuators associated with the guide pins to align the guide pins.

20. A molding apparatus as set forth in claim 1, further comprising a controller for controlling and operating the actuator.

21. A molding apparatus as set forth in claim 6, further comprising a controller for controlling and operating at least one of the actuators.

22. A molding apparatus as set forth in claim 11, further comprising a controller for controlling and operating at least one of the actuators.

23. A molding apparatus as set forth in claim 17, further comprising a controller for controlling and operating at least one of the actuators.

* * * * *